United States Patent [19]

Janssen

[11] 4,444,510
[45] Apr. 24, 1984

[54] STIRRER, HAVING SUBSTANTIALLY TRIANGULAR, RADIAL BLADES, RISING TOWARD THE CIRCUMFERENCE

[75] Inventor: Louis A. M. Janssen, Apeldoorn, Netherlands

[73] Assignee: Nederlandse Centrale Organisatie Voor Toegepast-Natuurwetenschappelijk Onderzoek, Netherlands

[21] Appl. No.: 357,656

[22] Filed: Mar. 12, 1982

[30] Foreign Application Priority Data

Mar. 17, 1981 [NL] Netherlands ......................... 8101294

[51] Int. Cl.³ .............................................. B01F 7/26
[52] U.S. Cl. .................................... 366/169; 366/263; 366/317
[58] Field of Search ............... 366/169, 171, 263, 264, 366/265, 316, 317, 325, 328, 330, 307

[56] References Cited

U.S. PATENT DOCUMENTS

| 184,894 | 11/1876 | Parks | 366/325 |
| 720,513 | 2/1903 | Cheney | 366/317 X |
| 941,948 | 11/1909 | Rees | 366/328 X |
| 1,084,210 | 1/1914 | Howard | 366/317 X |
| 2,637,330 | 5/1953 | Webster | 366/325 X |
| 2,816,661 | 12/1957 | Bounin | 366/325 X |

FOREIGN PATENT DOCUMENTS

| 730665 | 1/1943 | Fed. Rep. of Germany . |
| 1144693 | 3/1963 | Fed. Rep. of Germany . |
| 2346153 | 4/1975 | Fed. Rep. of Germany . |
| 1315140 | 12/1962 | France . |
| 1395397 | 3/1965 | France . |
| 88767 | 7/1958 | Netherlands . |
| 272419 | 12/1961 | Netherlands . |
| 137786 | 1/1973 | Netherlands . |
| 481674 | 1/1970 | Switzerland . |

Primary Examiner—Robert W. Jenkins
Assistant Examiner—Arthur D. Dahlberg
Attorney, Agent, or Firm—Eyre, Mann, Lucas & Just

[57] ABSTRACT

Stirrer, comprising a spindle (1) provided with a drive, to which spindle a disc or plate (2) is affixed, cut into star-shape and extending perpendicular to the axis, to which, on one or both sides of said disc or plate a plurality of stirring blades (4) is affixed, lying substantially in radially directed axial planes and having the form of substantially right-angled triangles having the longer base directed radially and the shorter perpendicular, parallel to the axis, lying as the extreme edge at the greatest distance from the axis, where moreover the number of stirring blades on one disc side amounts to at least 8, the height (h) of the extreme blade edge is equal to 0.5 to 2 times the perpendicular distance (a) of the extreme end of one blade to the successive blade, and the length (L) of the blades, measured along their hypothenuse, amounts to at least twice the height (h) thereof.

Preferably the number of blades on one disc side amounts to 12 or even 18. It is advantageous when the height (h) of the extreme edge of the blades amounts to 0.8 to 1.25 times the said perpendicular distance (a), and when the height of the extreme edge of blades is substantially equal to the said perpendicular distance.

17 Claims, 4 Drawing Figures

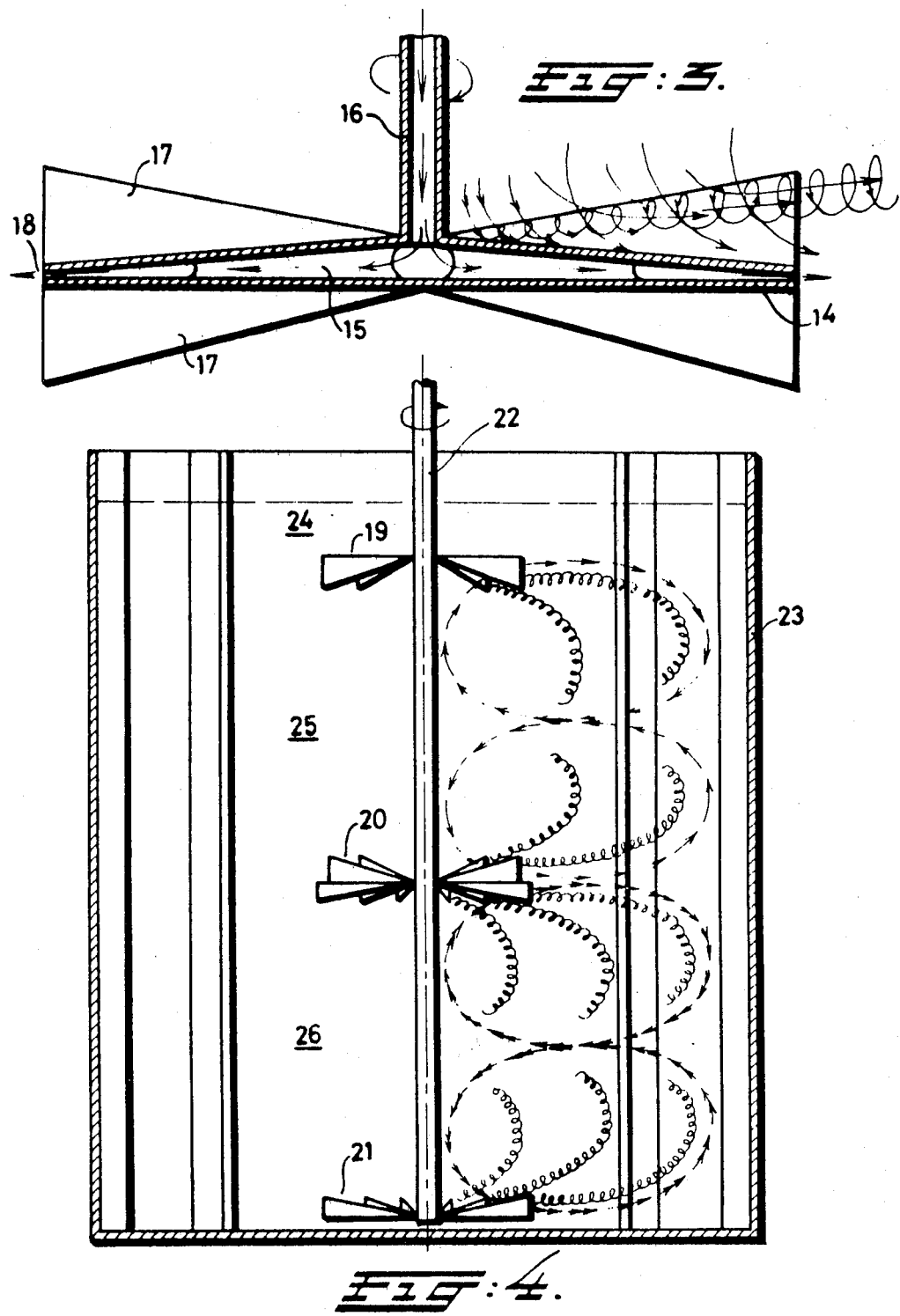

STIRRER, HAVING SUBSTANTIALLY TRIANGULAR, RADIAL BLADES, RISING TOWARD THE CIRCUMFERENCE

BACKGROUND OF THE INVENTION

1. Field of the Invention

The invention relates to a stirrer, comprising a spindle provided with a drive, to which spindle a plurality of stirring blades are affixed, lying substantially in radially directed axial planes.

2. Description of the Prior Art

A stirrer of the above-mentioned type is disclosed in the French Patent Specification No. 1,315,140. Stirrers of this type are usually indicated as turbine stirrers. They are used for mixing gasses and/or liquids, the so-called aeration of liquids, or the homogenisation of fluids or keeping them in homogenised condition.

The mixing action of a normal turbine stirrer, consisting in principle of a number (usually 4, sometimes 6) of blades directed radially parallel to the axis of rotation, which are connected by spokes, jibs or similar means to the spindle, arises by two phenomena:
 producing strong turbulence around the blades, and
 producing a circulatory flow in the vessel as a whole.

This circulatory flow, also called pumping action, is the result of the centrifugal field of forces in the fluid between the rotating blades, by which said fluid is, as it were, swung outwardly against the static pressure.

The turbulence required for mixing arises by the whirls behind all blade-edges, these whirls alternately arising and growing there and finally disengaging from the blade and being washed along with the circulatory flow. So hereby just the opposite is attained from what is aimed at by streamlining; sharp, angular blades, having a stream against them more or less perpendicularly to their plane, have a high resistance and make the required great intensity of turbulency arise.

With most of the turbine stirrers, however, the centrifugal flow is weak, whereby the area in which a good mixing is produced remains limited to the direct neighbourhood of the blades. Furthermore one should beware for the creation of cavitation in the whirls behind the blade edges, and thereby the filling of the whirls with gas, when increasing the number of revolutions too high, by which the mixing action declines strongly. Also the energy consumption is relatively high because of the high resistance of the blades at small pumping action. At great viscosity of the medium to be stirred furthermore the pumping action is generally too small to get sufficient circulation of all liquid.

The above mentioned limited mixing behaviour of most turbine stirrers, having various stirring blade shapes, is the result of the irregular disengagement pattern of the whirls at the edges of the turbine blades. Thereby the centrifugal action is irregular and the turbulence produced is very chaotic. As a consequence the pumping action is small and the whirls produced break each other up rapidly so that they extinguish quickly.

The above mentioned embodiment, known from the French Patent Specification No. 1,315,140, having stirring blades which are trapezium shaped, so have more or less the shape of a delta wing, already has the advantage as compared with other turbine stirrers, that a regularly, conically growing tipping whirl is produced along the edge of each blade which goes down angularly toward the circumference, which whirl leaves the blade, as a corkscrew whirl, with the centrifugal flow at the outer circumference. By the favourable distribution of pressure in the whirl, cavitation on the blades is prevented. Furthermore, corkscrew whirls are very stabile so that, when there is a stronger circulation, they will penetrate far into the medium and assure a good mixing.

Such stronger circulation is a result of the favourable distribution of pressure in the whirls by which an improvement of the pumping action is obtained. By the stronger circulation and the favourable division of turbulent energy in the vessel, the energy consumption per unit volume of the product to be mixed will also become relatively low.

SUMMARY OF THE INVENTION

The invention has for its primary object to optimise the stirrer of the above mentioned type, both as regards the mixing action and the pumping action and as regards the consumption of energy.

This object is attained according to the invention in that a disc or plate cut into star-shape is provided perpendicular to the axis, to which, on one or both sides of said disc or plate, the stirring blades are affixed, in form of substantially right-angled triangles having the longer base directed radially and the shorter perpendicular, parallel to the axis, lying as the extreme edge at the greatest distance from the axis, the number of stirring blades on one disc side mounting to at least 8, the height of the extreme blade edge being equal to 0.5 to 2 times the perpendicular distance of the extreme end of one blade to the successive blade, and the length of the blades, measured along their hypothenuse, amounting at least twice the height thereof.

The inventive concept is based upon the insight that the pumping action depends on the shape of the blades and on a relationship between the height of the extreme edge of the blades and the relative distance of the blades at the location of this extreme edge. By applying triangular rather than trapezium shaped blades it turns out that the conical whirl and also the centrifugal flow are enhanced. By particular ratios in shape and dimensions of the blades the space between two blades is for the greater part filled or closed by the conical tipping whirls, by which the pumping action becomes optimum. This is attained particularly when the ratio between the height of the extreme edge and the perpendicular mutual distance gets a value between 0.8 and 1.25 or, still better, when these dimensions become substantially equal to one another.

Furthermore, it has turned out that, to the extent that the number of blades is increased, so the (angular) distance between the blades becomes smaller, the height of the extreme edge of the blades should be correspondingly decreased in order to still obtain an optimum filling of the space between the blades with the conical whirls. It turns out to make no sense to apply, with a certain spacing between the blades, a much greater height of the edge. The conical whirls in that case do not go down deep enough between the blades, by which they influence each other, so that their strength decreases and the pumping action falls off. When the height of the edge becomes much smaller than the mutual spacing, a relatively small portion of the liquid which is tipping over the blade edge will arrive in the conical whirl, by which also the pumping action declines.

The effectiveness of mixing turns out to be improved, however, by increasing the number of blades, because therewith also the number of corkscrew whirls formed is increased. It has turned out that an increase in the number of blades from 8 to 12, or even to 18, results in a further improvement of the mixing action.

Finally it has turned out that, even with the same number of blades and length and height of the blades, the ratio between the strength of the disengaging corkscrew whirls and the centrifugal and pumping action can be influenced by changing the shape of the blades, to wit in any of the following two manners:

By making the hypothenuse or top edge of the blades slightly convex rather than straight, the centrifugal action is increased, and by making it concave is decreased. So the circulation is influenced by this.

By making the blades not accurately radial but orient them slightly forward or rearward relative to the sense of rotation of the stirrer, the strength of the tipping whirl is influenced, and thereby the mixing intensity.

Something similar can also be attained by bending the blades in vertical direction—i.e. perpendicular to the disc—slightly forwardly or rearwardly from the radial plane.

An important application of the inventive concept lies with a centrifugal impeller. This is a well known device which is mounted at the end of a driven hollow spindle for the supply of a fluid, and ending in a narrow circumferential slit through which, by rotation, the fluid supplied will leave the impeller.

This impeller may be provided with stirring blades as defined above, the radial length of the blades being substantially equal to the radial dimension of the centrifugal impeller.

With such centrifugal impeller a very good mixing, aeration or suspending can be obtained in an efficient manner. The thin film or liquid or air which comes out at the narrow circumferential impeller slit is broken up, by the fluid which is swung outwardly between the stirring blades and which is filled with corkscrew whirls, into very small particles, which will quickly be dispersed evenly.

When high viscosity liquids are to be mixed or aerated it has turned out to be favourable to do so in a vessel in which several stirrers according to the invention are mounted above one another on one driving spindle, and this with a spacing of one or two stirrer diameters so that a multiple stirrer or multi stirrer is produced. By this the vessel is virtually divided, in vertical direction, into compartments, each of which has a particular strength of the circulatory flow.

As is quite common a number of vertical baffles must be provided at the inside of the vessel, regularly divided over the circumference, in order to prevent that the whole contents of the vessel with start to turn along with the stirrer as a solid body, by which naturally the pumping action, and therefore also the mixing, would stop entirely.

With certain applications of the multi stirrer according to the invention it turned out to be of great importance that in a certain part of the mixing vessel one may obtain a stronger mixing and circulatory flow than in an other part, or that a more intense exchange of matter between the compartments is attained.

The former can be attained by making the number of blades on either side of the disc different, for example 8 high blades on one side and 12 or 18 blades on the other side, or no blades at all on one of the sides. The effect in form of a difference in mixing action can be further strengthened yet by giving the blades on the two sides different lengths, so that the centrifugal action, and therefore also the pumping action, will become different. It turns out that an improved exchange of matter can be attained by not arranging the blades on either side of the disc in the same radial planes, but for example those on one side centrally between those on the other side. The corkscrew whirls originating from the two sides of the disc will then be offset relative to one another, by which the exchange of fluid in the neighbouring circulation compartments of the mixing vessel will be strongly enhanced.

Finally it has turned out that, particularly for high viscosity liquids, it may be advantageous when the points of the triangular blades touching the spindle are truncated, so that right angled trapezium shaped blades are produced.

The side of the trapezium between the two right angles which is contiguous with the disc, should then be long relative to the height of the outer circumference of the stirrer, to wit at least 1.5 times as big, in order to maintain a sufficient centrifugal action. By such truncating the supply and influx of the viscous medium between the blades close to the spindle is made easier, so that an improved pumping action is obtained.

The features of the present invention which are believed to be novel are set forth with particularity in the appended claims.

Other claims and many of the attendant advantages will be more readily appreciated as the same becomes better understood by reference of the following detailed description and considered in connection with the accompanying drawings in which like reference symbols designate like parts throughout the figures.

DESCRIPTION OF THE DRAWINGS

FIG. 3 is a sectional view through a centrifugal impeller provided with stirring plates according to the invention.

FIG. 4 schematically shows a multi stirrer in a vessel.

DESCRIPTION OF THE PREFERRED EMBODIMENTS

Figure 1:
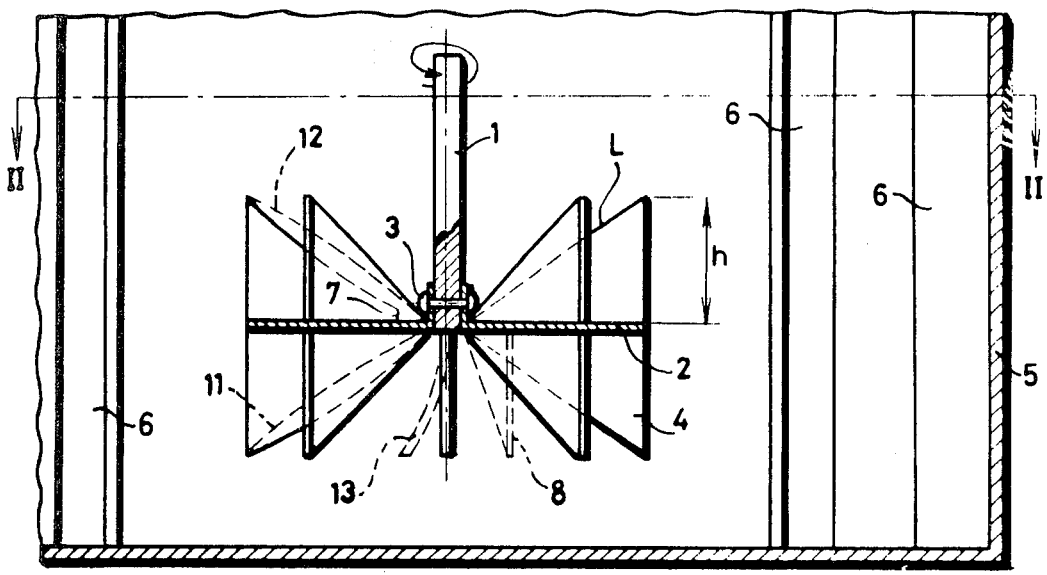
FIG. 1 is a schematic sectional view according to the arrows I—I in FIG. 2 through a stirrer according to the invention arranged in a vessel.
Figure 2:
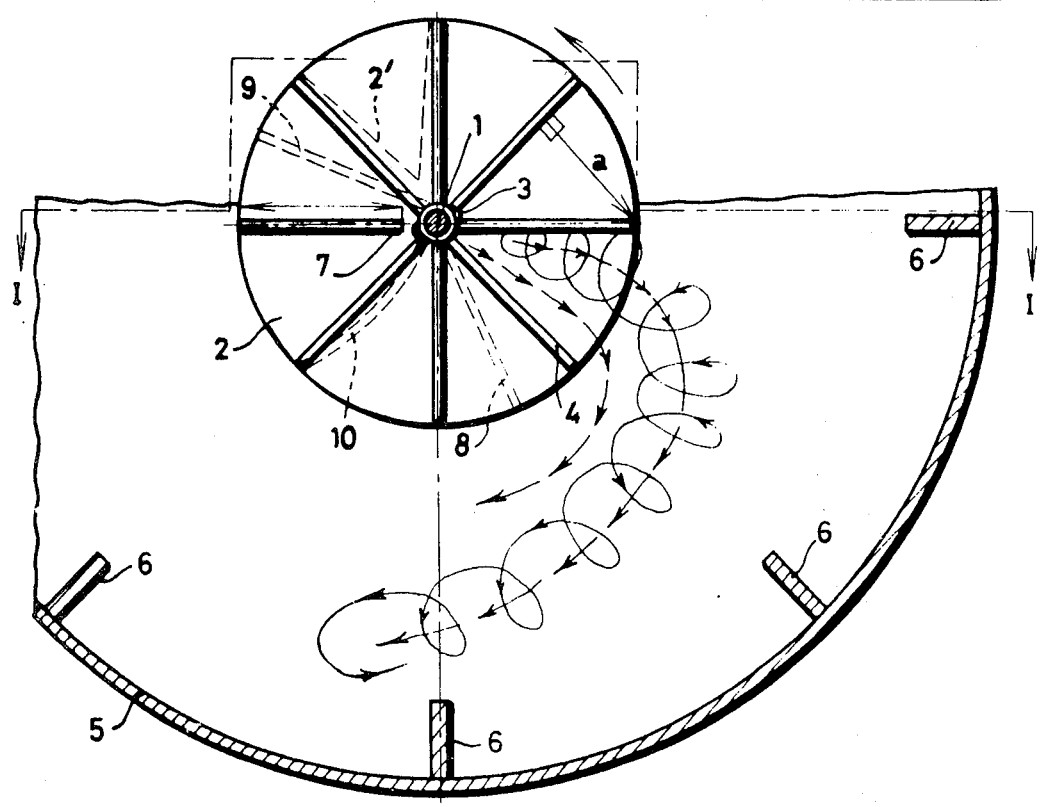
FIG. 2 is a part sectional view through the vessel with the stirrer, taken according to the arrows II—II in FIG. 1.

In FIGS. 1 and 2 a driving shaft 1 is visible to which a disc 2 is attached by means of a pin or lockingbolt 3. On this disc on either side triangular blades 4, eight in number, are mounted radially directed. This stirrer, is placed in a substantially cylindrical vessel 5 which is provided at its circumference with vertical braking baffles 6, eight in number.

Instead of to a disc the blades may also be mounted on a plate which has been cut into star shape, as schematically indicated at 2'.

The blades are substantially right angled triangles, the height h of which at the outer circumference is about equal to the perpendicular distance a from the extreme edge of one blade to the next blade. The hypothenuse or top edge L of the blades is at least twice the height h.

In FIG. 1 it is indicated schematically at 11 and 12 that this top edge, instead of straight may alternatively be realised concave or convex.

In FIG. 1 it is also indicated schematically at 13 that the blades, instead of being realised as a flat plane, alternatively may be bent in vertical direction, and this both opposite to and in the same sense of rotation as the impeller.

Furthermore in FIG. 2 at 9 and 10 it is indicated schematically that the blades instead of accurately radially may alternatively be directed somewhat tangentially or curved, respectively, and this both opposite to and in the same sense of rotation as the stirrer.

In both figures it is indicated schematically at 7 that the blades may be truncated at their top near the spindle. The radial length L of the blades should in that case, however, still amount to at least one and a half time the blade height h.

Finally in both figures it is indicated schematically by a broken line at 8 that the blades on one side of the disc may be arranged offset i.e. in different radial planes, relative to those on the other side.

In FIG. 3 it is indicated how the stirrer can be combined with a centrifugal impeller 14 having blades 15 and being mounted at the extremity of a hollow shaft 16. On one or the two outer surfaces of this impeller the stirrer blades 17 are provided. The fluid which is present in the vessel can be mixed, by means of this centrifugal stirrer, with a gas or liquid, which is supplied through the hollow spindle and leaves the impeller as a film through the thin circumferencial slit 18. This film is broken up into fine particles by the fluid which is swung outwardly between the stirrer blades and it is mixed intensely with the fluid by the corkscrew whirls.

In FIGS. 2 and 3 the flow between the stirrer blades is indicated schematically. Along the leeside top edge of each blade at the point near the spindle a tipping whirl arrises, which toward the circumference progressively increases in strength and dimensions. Passing over this whirl fluid is taken to the leeside lower portion of the blade surface, after which it is swung outwardly by centrifugal action. The fluid which enters the whirl is transported also, by this centrifugal action but moreover to a great extent by the course of the pressure in the conical whirl, transported at a great speed to the circumference of the impeller.

Because the pumping action is the most intense in the whirl, it is therefore most favourable for the effectiveness of this stirrer, when the whirl will fill the space between two successive blades to the greater part. This explains the optimum proportion for the dimensions of the two stirrer blades mentioned for this invention.

In FIG. 4 it is indicated schematically how a plurality of stirrers 19, 20 and 21 can be mounted on one driving shaft 22 in a vessel 23 and thus constitute a multi stirrer. Also it is shown that these stirrers may have a different number of blades of different dimensions on either side of the disc. Thereby the circulation and mixing in each of the compartments 24, 25 and 26 of the vessel between two successive stirrers may be different.

Because stirrer 19 is only "half" a stirrer, i.e. only has blades on one side of the disc, there will not occur mixing in compartment 24. In compartment 25 there is some mixing and in compartment 26 the most intense circulation prevails and therefore mixing is the fastest. As a matter of course various combinations in the order of mixing action in compartments of a vessel can be obtained depending on the requirements of the mixing process concerned.

Also as a matter of course it is possible that one or more stirrers are realised as a centrifugal stirrer, the supply of the fluid to be admixed thereby occurring through the hollow driving spindle.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A stirrer comprising a spindle with a drive therefor, a plate affixed to the spindle and perpendicular to the axis thereof; a plurality of stirring blades disposed on at least one side of said plate, said stirring blades lying substantially along radially directed axial planes, and having the form of substantially right-angled triangles, each having the longer base directed radially and the shorter perpendicular side, parallel to the axis of the spindle forming the extreme edge of the blade at the greatest distance from the axis, there being at least 8 of said stirring blades on said at least one side, the height of the extreme edge being in the range of from about 0.8 to about 1.25 times the perpendicular distance of the extreme end of one blade to the next blade, and the length of each blade, measured along its hypothenuse being at least twice the height thereof.

2. Stirrer as in claim 1, wherein the number of stirring blades on one side amounts to at least 12.

3. Stirrer as in claim 1, wherein the number of stirring blades on one side amounts to at least 18.

4. Stirrer as in claim 1, wherein the height of the extreme edge of the blades is substantially equal to the said perpendicular distance.

5. Stirrer as in claim 1, wherein the number of blades on either side of the plate is different.

6. Stirrer as in claim 1, wherein the length of the blades on either side of the plate is different.

7. Stirrer as in claim 1, wherein the top edge of each blade, extending substantially according to the hypothenuse of the triangular shape, is slightly bent convexly.

8. Stirrer as in claim 1, wherein the point of each blade touching the spindle is truncated, such that it obtains substantially the shape of a trapezium having two right angles and a perpendicular therebetween which is at least one and a half times as big as the side at the circumference of the stirrer.

9. Stirrer as in claim 1, wherein a plurality of plates provided with blades are mounted on one spindle at a spacing of between 1 and 2 diameter lengths.

10. Stirrer as in claim 1 wherein said plate is disc shaped.

11. Stirrer as in claim 1 wherein said plate is cut into a star shape.

12. Stirrer as in claim 1 wherein there are blades on each side of the plate and wherein the blades on one side of the plate are situated in planes different from the planes of the blades on the other side.

13. Stirrer as in claim 1 wherein the top edge of each blade, extending substantially according to the hypothenuse of the triangular shape, is slightly bent concavely.

14. A stirrer, comprising a spindle provided with a drive, to which spindle a plurality of stirring blades is affixed, the improvement comprising a plate affixed to the spindle perpendicular to the axis thereof, on at least one side of said plate a plurality of stirring blades being affixed, the blades lying in planes which are bent or slightly inclined in radial direction with respect to an accurately radial plane, said blades having the form of substantially right angled triangles each having the longer base directed radially and the shorter perpendicular parallel to the axis, lying as the extreme edge at the greatest distance from the axis, the number of stirring blades on said one side amounting to at least 8, the height of the extreme blade being about 0.8 to about 1.25 times the perpendicular distance of the extreme end of one blade to the successive blade, and the length of the blades, measured along their hypothenuse, being at least twice the height thereof.

15. A stirrer comprising a spindle provided with a drive, to which spindle a plurality of stirring blades is affixed, the improvement comprising a plate affixed to the spindle perpendicular to the axis thereof, on at least one of said plate a plurality of stirring blades being affixed, the blades lying in planes which are slightly inclined in vertical direction perpendicular to the plate, said blades having the form of substantially right angled triangles each having the longer base directed radially and the shorter perpendicular parallel to the axis, lying as the extreme edge at the greatest distance from the axis, the number of stirring blades on said one side amounting to at least 8, the height of the extreme blade edge being about 0.8 to about 1.25 times the perpendicular distance of the extreme end of one blade to the successive blade, and the length of the blades, measured along their hypothenuse, being at least twice the height thereof.

16. Centrifugal impeller, affixed at the end of a driven hollow spindle for the supply of a fluid, and terminating into a narrow circumferential slit through which, during rotation, the fluid supplied leaves the impeller, the improvement comprising a plurality of stirring blades mounted on the impeller, the radial length of the blades being substantially equal to the radial dimension of the centrifugal impeller, and the blades having the form of substantially right angled triangles each having the longer base directed radially and the shorter perpendicular parallel to the axis, lying as the extreme edge at the greatest distance from the axis, the number of stirring blades on one side amounting to at least 8, the height of the extreme blade edge being about 0.8 to about 1.25 times the perpendicular distance of the extreme end of one blade to the successive blade, and the length of the blades, measured along their hypothenuse, amounting to at least twice the height thereof.

17. Centrifugal impeller as in claim 16, wherein the height of the extreme edge of the blades is substantially equal to the said perpendicular distance.

* * * * *